US009551249B2

(12) United States Patent
Argolini et al.

(10) Patent No.: US 9,551,249 B2
(45) Date of Patent: Jan. 24, 2017

(54) AFTERTREATMENT SYSTEM FOR INTERNAL COMBUSTION ENGINES

(71) Applicant: GM GLOBAL TECHNOLOGY OPERATIONS LLC, Detroit, MI (US)

(72) Inventors: Roberto Argolini, Milan (IT); Davide Mercuri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/614,055

(22) Filed: Feb. 4, 2015

(65) Prior Publication Data

US 2015/0218988 A1 Aug. 6, 2015

(30) Foreign Application Priority Data

Feb. 5, 2014 (GB) ................................. 1401939.2

(51) Int. Cl.
| | |
|---|---|
| *F01N 3/00* | (2006.01) |
| *F01N 3/08* | (2006.01) |
| *F01N 13/00* | (2010.01) |
| *B01D 46/00* | (2006.01) |
| *F01N 9/00* | (2006.01) |

(Continued)

(52) U.S. Cl.
CPC ......... *F01N 3/0821* (2013.01); *B01D 46/0057* (2013.01); *F01N 3/021* (2013.01); *F01N 3/0814* (2013.01); *F01N 3/0842* (2013.01); *F01N 3/0885* (2013.01); *F01N 9/00* (2013.01); *F01N 9/002* (2013.01); *F01N 9/005* (2013.01); *F01N 11/007* (2013.01); *F01N 13/009* (2014.06); *F02B 37/00* (2013.01); *G05B 15/02* (2013.01); *F01N 2560/025* (2013.01); *F01N 2560/06* (2013.01); *F01N 2900/1404* (2013.01);

(Continued)

(58) Field of Classification Search
USPC .......... 60/274, 276, 278, 286, 295, 297, 301
See application file for complete search history.

(56) References Cited

U.S. PATENT DOCUMENTS 7,155,331 B1 * 12/2006 Zhang ................... F01N 3/0821
60/286
7,600,373 B2 * 10/2009 Matsuno ............... F01N 3/0253
60/285

(Continued)

OTHER PUBLICATIONS

UKIPO, British Search Report for British Application No. 1401939.2, dated Sep. 15, 2014.

*Primary Examiner* — Binh Q Tran
(74) *Attorney, Agent, or Firm* — Lorenz & Kopf LLP (57) ABSTRACT

An aftertreatment system of an internal combustion engine is disclosed. The aftertreatment system includes in a sequence along the exhaust pipe, a lean NOx trap and a particulate filter. An air/fuel ratio sensor is located upstream of the lean NOx trap and downstream of the turbine outlet to determine the air/fuel ratio during a regeneration process (DeNOx) in the lean NOx trap. A NOx sensor is located downstream of the lean NOx trap or downstream of the particulate filter, to determine NOx in the exhaust pipe. A turbine temperature is determined in accordance with a first means, and a temperature during a desulphation process (DeSOx) in the lean NOx trap is determined in accordance with a second means. At least one of the first and second means for determining a temperature may be a temperature sensor.

7 Claims, 4 Drawing Sheets

(51) Int. Cl.
*F01N 11/00* (2006.01)
*F02B 37/00* (2006.01)
*G05B 15/02* (2006.01)
*F01N 3/021* (2006.01)

(52) U.S. Cl.
CPC ....... *F01N 2900/1614* (2013.01); *Y02T 10/24* (2013.01); *Y02T 10/47* (2013.01)

(56) References Cited

U.S. PATENT DOCUMENTS

| | | | |
|---|---|---|---|
| 7,707,826 B2* | 5/2010 | Wang | F01N 3/0231 60/274 |
| 8,943,804 B2* | 2/2015 | Schreurs | F01N 3/035 60/278 |
| 8,978,362 B2* | 3/2015 | Christner | B01D 53/9409 60/273 |
| 9,038,611 B2* | 5/2015 | Lyon | F02M 25/0707 123/568.11 |
| 9,144,761 B2* | 9/2015 | Quix | B01D 46/0057 |
| 2011/0131949 A1 | 6/2011 | Adams et al. | |

\* cited by examiner

AFTERTREATMENT SYSTEM FOR INTERNAL COMBUSTION ENGINES

CROSS-REFERENCE TO RELATED APPLICATION

This application claims priority to British Patent Application No. 1401939.2, filed Feb. 5, 2014, which is incorporated herein by reference in its entirety.

TECHNICAL FIELD

The present disclosure relates to an aftertreatment system for an internal combustion engine. Such system and the way in which it can operate are suitable for overcoming EURO 6, second stage, standard emission.

BACKGROUND

It is known that exhaust gas aftertreatment systems of a Diesel engine can be provided with a Lean NOx Trap or LNT. An LNT is provided for trapping nitrogen oxides (NOx) contained in the exhaust gas and is located in the exhaust line. Moreover, such exhaust gas aftertreatment systems are normally provided with a diesel particulate filter or DPF for control of particulates.

An LNT is a catalytic device containing catalysts, such as rhodium, platinum and palladium, and absorbents, such as barium-based elements, which provide active sites suitable for binding the nitrogen oxides (NOx) contained in the exhaust gas, in order to trap them within the device itself. Lean NOx traps are subjected to periodic regeneration processes, whereby such regeneration processes are generally provided to release and reduce the trapped nitrogen oxides (NOx) from the LNT.

The LNT is operated cyclically, for example by switching the engine from lean-burn operation to an operation whereby an excess amount of fuel is available, also referred to as a rich operation or a regeneration phase (DeNOx). During normal operation of the engine, NOx is stored on a catalytic surface. When the engine is switched to rich operation, NOx stored on the absorbent site react with the reductants in the exhaust gas and are desorbed and converted to nitrogen and ammonia, thereby regenerating the absorbent site of the catalyst.

Due to the presence of sulphur into the fuel, an LNT is exposed to the sulphur poisoning, which reduces the NOx storage capacity of the catalyst. In order to re-enable the capability of the aftertreatment system, a desulphation (also called DeSOx regeneration or simply DeSOx) is needed. The DeSOx includes the provision of a fast alternation of lean and rich atmosphere (hereafter, wobbling) at high temperature during engine working conditions.

A generic layout of an aftertreatment system for an internal combustion engine equipped with an LNT and a DPF in closed coupled position (which means the aftertreatment devices are located close to the turbine outlet, at the beginning of the exhaust pipe) includes one canning with lean NOx trap and a particulate filter, one temperature sensor at LNT inlet, one temperature sensor at LNT outlet, one air/fuel ratio sensor at LNT inlet, one air/fuel ratio sensor at LNT outlet and one pressure sensor at LNT outlet. The LNT specific modes, generically called regenerations (namely DeNOx, DeSOx Lean and DeSOx Rich), are obtained through engine actuators (injectors, exhaust gas recirculation valve, variable geometry turbine and others) which are moved to dedicated set points in order to achieve the desired combustion properties, using information mainly coming from the mentioned sensors.

The lean NOx trap is a cost efficient alternative to a selective catalytic reduction (SCR) system, which operates thanks to a fluid catalyst such as urea, or ammonia, or a combination thereof (generally in a water solution) injected into the exhaust line of the engine in order to promote the reduction of NOX. On the other hand, the LNT efficiency and diagnosis is really difficult to be controlled, especially in view of more and more stringent emission limits as foreseen by the Euro 6 emission standard in its second stage, where real driving cycles will be used for the verification of "In Use Compliance" of the emission limits.

Therefore a need exists for a new aftertreatment system and a method of operating the lean NOx trap, which overcomes the above inconvenience, thus avoiding a more expensive system, as the selective catalytic reduction system.

SUMMARY

In accordance with the present disclosure, an aftertreatment system for internal combustion engines, in particular Diesel engines and a method of operating a lean NOx trap of an aftertreatment system are provided which can allow the lean NOx trap to be used also to overcome the upcoming emission standards.

An embodiment of the disclosure provides an aftertreatment system of an internal combustion engine. The engine includes at least a turbine and an exhaust pipe connected to a turbine outlet. The aftertreatment system includes in a sequence along the exhaust pipe, a lean NOx trap and a particulate filter. The aftertreatment system further includes an air/fuel ratio sensor, located upstream of the lean NOx trap and downstream of the turbine outlet to determine the air/fuel ratio during a regeneration process (DeNOx) in the lean NOx trap, a NOx sensor, located downstream of the lean NOx trap or downstream of the particulate filter, to determine NOx storage and NOx conversion in the lean NOx trap. A turbine temperature is determined in accordance with a first means, and a temperature during a desulphation process (DeSOx) in the lean NOx trap is determined in accordance with a second means. At least one of the first and second means for determining a temperature may be a temperature sensor.

An advantage of this embodiment is that this system does not require the use of an expensive system for the NOx reduction, such as the selective catalytic reduction system and at the same time provide an aftertreatment system, which can be controlled to get the desired efficiency and be compliant with new homologation rules, as foreseen by the Euro 6 emission standard in its second stage, where real driving cycles will be used for the verification of "In Use Compliance" of the emission limits.

According to a further embodiment, the lean NOx trap and the particulate filter are closely coupled to the turbine outlet. An advantage of this embodiment is that catalytic converters are located near the engine's exhaust manifold. Such aftertreatment system heats up quickly due to its proximity to the engine, and reduces cold-engine emissions by burning off hydrocarbons from the extra-rich mixture used to start a cold engine. Furthermore, overall engine dimensions can be reduced with such aftertreatment architecture.

According to another embodiment, further a thermal detector is provided at the lean NOx trap inlet. An advantage of this embodiment is that the temperature at the LNT inlet can be directly determined by a sensor or the ECU can use a temperature calculation model, whenever the latter is available and can be calibrated in a reliable way.

In another embodiment, the disclosure provides an internal combustion engine including an aftertreatment system according to any of the previous embodiments.

A still another embodiment of the disclosure provides a method of operating a lean NOx trap of an aftertreatment system. In accordance with the method, a NOx storage amount in a lean NOx trap is evaluated as a function of a NOx amount, which derives from an engine combustion, and a NOx measurement downstream of the lean NOx trap, which is performed by a NOx sensor. NOx tailpipe emissions are evaluated as a function of the NOx storage amount. A regeneration process (DeNOx) is requested, when NOx tailpipe emissions exceed a NOx amount threshold and when a temperature value provided by a turbine temperature sensor is above a first temperature threshold and a temperature value provided by a temperature sensor downstream of the lean NOx trap is above a second temperature threshold. The regeneration process is controlled by using air/fuel ratio values provided by an air/fuel ratio sensor located upstream of the lean NOx trap and the NOx sensor, which have to be below an air/fuel ratio threshold. An apparatus is also disclosed for performing the foregoing method of operating a lean NOx trap. The method a can be carried out with the help of a computer program including a program-code for carrying out all the steps of the method described above, and in the form of computer program product including the computer program. The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

An advantage of this embodiment is that the method is proposing a way to manage the lean NOx trap to get the desired efficiency and be compliant with new homologation rules, the ones which will be required by the Euro 6, second stage, emission standard.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
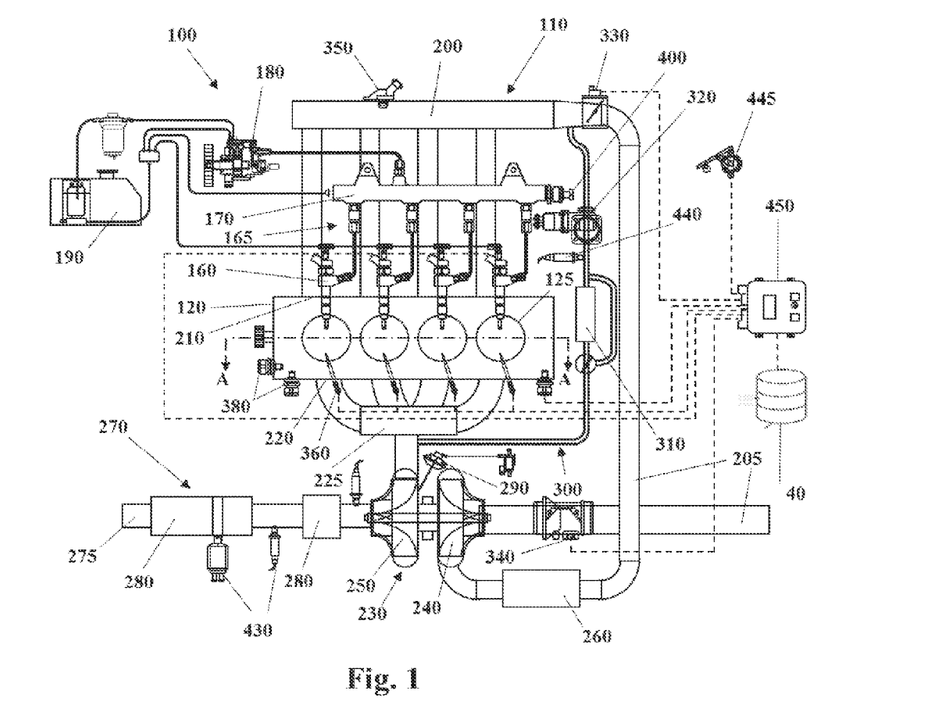
FIG. 1 shows an automotive system.
Figure 2:
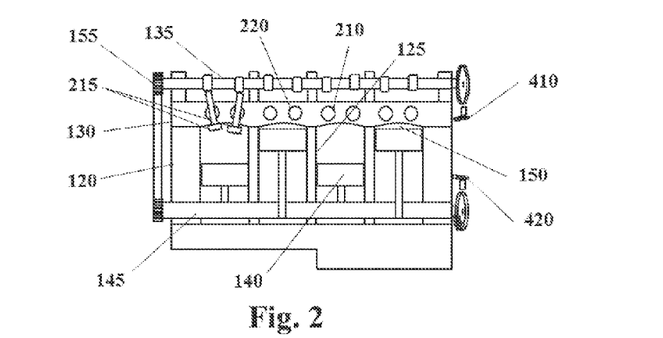
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) 250 with a VGT actuator 290 arranged to move the vanes to alter the flow of the exhaust gases through the turbine. In other embodiments, the turbocharger 230 may be a fixed geometry turbine including a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

An lean NOx trap or LNT is an aftertreatment device allowing the reduction of NOx emissions, having at the same time the functionality of an oxidation catalyst, so it can be used in replacement of a Diesel Oxidation Catalyst (DOC), close coupled to the turbine outlet 255, therefore, just in a first portion of the exhaust pipe 275, the one closest to the engine. As mentioned, LNT is an alternative solution to SCR system, which does not require an additional dosing system but with dedicated washcoat and coating technology.

The LNT control strategy is based on the following phases: a) loading phase: during normal mode the lean NOx trap acts as trap for NOx and oxidizes hydrocarbons (HC) and CO as a normal oxidation catalyst; b) NOx regeneration phase (DeNOx): this is a short period (approximately, it takes 5-8 sec) during which a rich air/fuel mixture (i.e. air/fuel ratio <1) is available and the LNT can be cleaned up and its storage capacity can be recovered; c) SOx regeneration phase (DeSOx): after some thousand kilometers, sulphur contained in the diesel fuel poisons the lean NOx trap and therefore, before such poisoning happens, a desulphurization phase is needed. This is composed by several rich combustion phases (air/fuel ratio <1) performed at high temperature (gas temperature at LNT inlet around 650° C., with the same temperature as for particulate filter regeneration.

To perform NOx/SOx regenerations it is necessary to have a rich combustion and to control the air/fuel ratio value across the catalyst. With the current architecture, the air/fuel ratio sensor at the LNT outlet is used to detect the end of the regeneration phase and to monitor the LNT emission reduction efficiency, while the one at the LNT inlet is used to perform a closed loop control of the air/fuel mixture. Moreover during the loading phase (that is to say, during normal engine combustion), the air/fuel ratio sensor at the LNT inlet is used to adapt drifts over lifetime of injected fuel and mass air flow meter signal.

Figure 3:
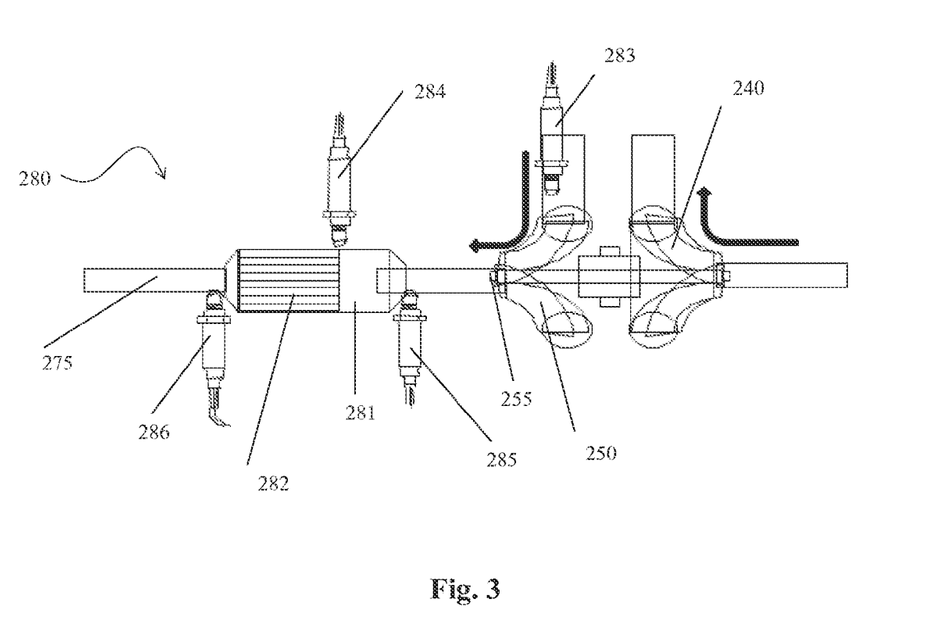
FIG. 3 is a schematic overview of an aftertreatment system of the internal combustion engine.

With reference to FIG. 3, the proposed embodiments identify a minimum system equipment in terms of sensors and catalysts to be able to fulfill Euro 6, second stage, emission limits. The idea is to use a lean NOx trap 281 plus a particulate filter 282 in closed couple configuration, controlled by an air/fuel ratio sensor 285 upstream of the LNT and a NOx sensor 286 downstream of the DPF or downstream of the LNT. The air/fuel ratio sensor is placed upstream of the LNT catalyst, close to the turbine outlet 255 to avoid clogging and take advantages of higher exhaust mass flow temperatures. The NOx sensor 286 should also have an AFR functionality and is placed downstream of the DPF to account also for NOx storage/conversion on the particulate filter.

In addition, thermal detectors are used to determine a turbine temperature and a temperature during a desulphation process in the lean NOx trap. For example, two temperature sensors including, a first sensor 283 placed before the turbine 250 and a second sensor 284 before the DPF 282 may be used. The first temperature sensor 283 shall be placed upstream of the turbine to protect it from the high temperature, which is reached during a rich combustion phase. The second temperature sensor 284 shall be placed upstream of DPF to be used to control the temperature during DeNOx/DeSOx regenerations.

As an alternative to using input from temperature sensors, the thermal detector may include temperature calculation models used in the ECU to determine temperature values. An example of a temperature calculation model is an algorithm, which estimates the temperature in a specific place (e.g. before the turbine). The temperature estimation is based on the conservation of energy law: at first, the exhaust gas enthalpy is estimated as a function of the engine and turbocharger operating conditions (speed, load, pressure); then by applying the conservation of energy law, the gas temperature is calculated as a function of the exhaust gas enthalpy. If only the first temperature sensor 283, which is placed before the turbine 250, is available, the second temperature sensor 284, located upstream of the DPF, can be replaced by a temperature calculation model, whose algorithm will use the filtered signal of the sensor upstream the turbine. As known, software filters are useful for performing signal conditioning, removing noise from a signal, or rejecting unwanted signals. If only the second temperature sensor 284, which is placed before the DPF is available, the first temperature sensor 284, located upstream of the turbine, can be replaced by a further temperature calculation model, whose algorithm will use the accelerated signal of the sensor upstream of the DPF. As known, software accelerators are useful for simulating fast dynamic responses.

The air/fuel ratio sensor 285 is placed in the exhaust pipe upstream of the LNT catalyst near the turbine outlet 255, to avoid air/fuel clogging and take advantages of higher exhaust mass flow temperatures.

The NOx sensor 286 with also the air/fuel ratio functionality is placed downstream the DPF to account also for NOx storage/conversion on the particulate filter.

The first temperature sensor 283 shall be placed upstream of the turbine to protect the turbine from high temperatures, which are reachable during rich combustion.

A further temperature sensor 284 shall be placed upstream the DPF to be used to control the temperature during the DeSOx regeneration.

Preferably a further temperature model shall be used to estimate the temperature at the LNT inlet, by using the information coming from the other two temperature sensors. In alternative a further temperature sensor can be provided at the LNT inlet. Moreover, a NOx engine out model is used to account of the engine emission going into the LNT. For NOx engine out is to be intended the NOx amount deriving from the engine combustion in the combustion chamber. Then, the NOx sensor 286 is used to monitor the tailpipe emissions calculating both mg/km and g/s of NOx.

Figure 4:
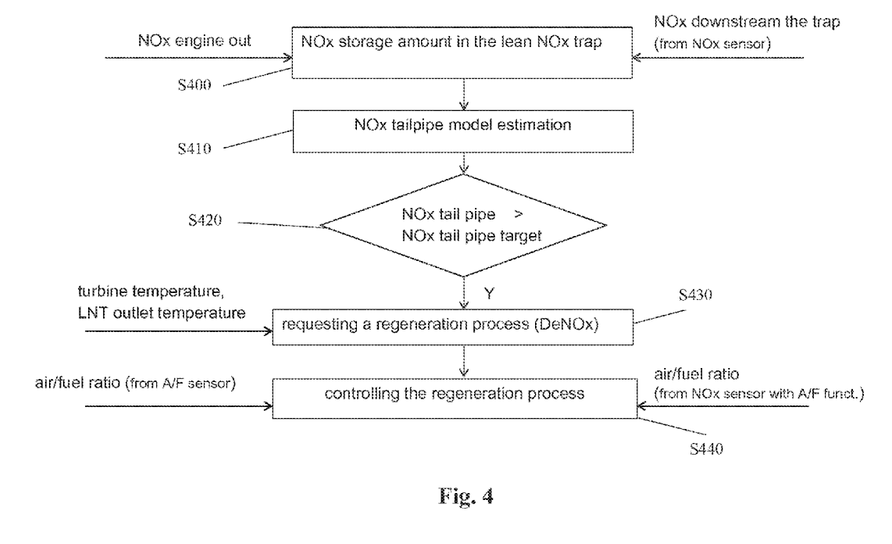
FIG. 4 shows a flowchart of a method of operating the lean NOx trap, according to an embodiment of the present disclosure.

With reference to FIG. 4, representing a high level flowchart of a method of operating the lean NOx trap, according to an embodiment of the present disclosure, based on the defined architecture the method will perform the following steps. At first, the evaluating a NOx storage amount in the lean NOx trap is evaluated in step S400. The NOx storage model estimation will be determined as a function of the NOx engine out amount, in other words the amount of NOx which is produced by the combustion process in the engine combustion chamber, and NOx measurement downstream of the trap, performed by the NOx sensor 286. Then, the evaluation 5410 of the NOx tailpipe amount can be performed. The NOx tailpipe amount is the amount of NOx which will leave the aftertreatment system and will be detected at the end of the tailpipe of the exhaust line. The amount of the tailpipe NOx will be a function of the NOx storage amount, previously calculated. When the NOx tailpipe amount will exceed the NOx tailpipe target S420, a regeneration process (DeNOx) will be requested S430. The NOx tailpipe targets will be established as a function of several conditions: ambient (pressure, temperature) conditions, combustion mode, engine operating conditions (speed, load). The request for a DeNOx process will be allowed by the engine controller if the temperature values coming from the turbine temperature sensor 283 and the LNT outlet temperature sensor 284 will enable such request, are above predetermined temperature thresholds $T_{thr1}$, $T_{thr2}$. As an example, these temperature thresholds can be respectively fixed to: $T_{thr1}$=300° C. for the temperature measured by turbine temperature sensor 283; $T_{thr2}$=180° C. for the LNT outlet temperature sensor 284. Finally, the regeneration process will be controlled S440 by using input from the air/fuel ratio sensor 285 located upstream the LNT and the NOx sensor 286, downstream the trap. The air/fuel ratio value shall be below an air/fuel ratio threshold, which can be around 0.95-1.

Figure 5:
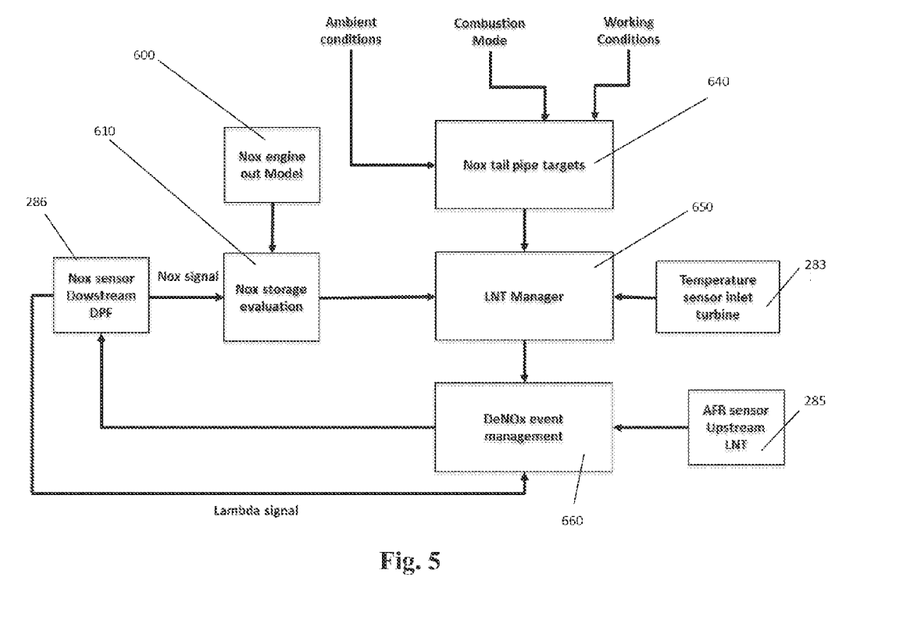
FIG. 5 is a more detailed block scheme of the flowchart of FIG. 4.

In FIG. 5 a more detailed block scheme of the proposed configuration is shown. In order to push the LNT system towards high NOx conversion efficiency, it is needed to manage all the situations where there is a NOx slip out of the LNT catalyst (for instance: NOx release during DeNOx event, NOx release due to high temperatures during acceleration) and therefore to manage the DeNOx events to re-gain the efficiency and to be compliant with emission legislation.

A first block 600 represents an engine out NOx model, calculating the NOx amount, which derives from an engine combustion. An example of such a model can be a predictive model, using simple yet physically-based models for fuel injection, ignition delay, premixed heat release rate and diffusion combustion heat release rate.

The engine out NOx model is used to account the engine emission going into the LNT, in other words the NOx storage evaluation, block 610. Also for NOx storage evaluation, different simulation models are available, typically based on the assumption that diffusion into the storage particles is strongly affected by solid volume changes. Alternatively, the NOx storage evaluation can be estimated as the difference between the NOx engine out amount and NOx tailpipe emission amount, which are measured by the NOx sensor 286.

Emission targets to be fulfilled (block 640) are calculated based on environmental conditions, desired combustion mode and the engine working conditions in terms of temperature, load and speed. In this way it is possible to account also for idle performances as well as full load conditions and the system performances can be driven in the best way to optimize fuel consumption and emissions reduction. Once the tailpipe limits are exceed, then the LNT manager (block 650) will ask for a DeNOx regeneration (block 660).

The DeNOx event will use then the air/fuel ratio sensor 285 to reach the desired air/fuel ratio target while the air/fuel ratio functionality of the NOx sensor 286 downstream the DPF will establish when the event is concluded.

The diagnostic efficiency monitoring in this proposed HW configuration will be possible comparing the NOx engine out flow with the tailpipe one measured by the NOx sensor in some defined conditions. Finally the information about the temperature inlet turbine shall be used to interrupt the rich combustion for HW protection.

So it could be said that with the proposed minimal HW configuration and logic the euro 6, second stage, emission target could be fulfilled increasing the performances of the LNT and minimizing the fuel consumption with consequently cost saving respect to a standard SCR system.

Summarizing, the purpose of this present disclosure is to propose a way to manage LNT+DPF system to get the desired efficiency and be compliant with new homologation rules, at the same time providing a cost reduction respect to a SCR system.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed:

1. An aftertreatment system for an internal combustion engine having a turbine and an exhaust pipe connected to a turbine outlet, the aftertreatment system comprising:
    a lean NOx trap and a particulate filter in a sequence along the exhaust pipe;
    an air/fuel ratio sensor located upstream of the lean NOx trap and downstream of the turbine outlet, the air/fuel ratio sensor configured to determine an air/fuel ratio during a NOx regeneration process in the lean NOx trap;
    a NOx sensor located downstream of at least one of the lean NOx trap and the particulate filter, the NOx sensor configured to determine a NOx tailpipe emission in the exhaust pipe;
    a first thermal detector configured to determine an inlet temperature upstream of the turbine;
    a second thermal detector configured to determine an LNT temperature during a desulphation process in the lean NOx trap; and
    a controller in communication with the air/fuel ratio sensor, the NOx sensor and the first and second thermal detectors, wherein the controller is configured:
    initiate the NOx regeneration process when: (i) the NOx tailpipe emission provided from the NOx sensor exceeds a NOx amount threshold, (ii) the inlet temperature provided from the first thermal detector is above a first temperature threshold, and (iii) the LNT temperature provided from the second thermal detector is above a second temperature threshold; and
    control the NOx regeneration process usin the air/fuel ratio provided from the air/fuel ratio sensor and the NOx tailpipe emission from the NOx sensor such that the air/fuel ratio remains below an airlfuel rutratio threshold during the NOx regeneration process.

2. The aftertreatment system according to claim 1 further comprising a third thermal detector configured to determine a temperature at the lean NOx trap inlet.

3. The aftertreatment system according to claim 1, wherein said lean NOx trap and said particulate filter are configured to be close coupled to the turbine outlet.

4. The aftertreatment system according to claim 3 further comprising a third thermal detector configured to determine a temperature at the lean NOx trap inlet.

5. An internal combustion engine comprising a turbine and an exhaust pipe connected to a turbine outlet and an aftertreatment system according to claim 1.

6. A method of operating a lean NOx trap of an aftertreatment system, wherein the method comprises:
    evaluating a NOx storage amount in a lean NOx trap as a function of a NOx amount, which derives from an engine combustion, and a NOx measurement downstream of the lean NOx trap, which is performed by a NOx sensor;
    evaluating NOx tailpipe emissions as a function of the NOx storage amount;
    initiating a NOx regeneration process when: (i) a NOx tailpipe emissions provided from the NOx sensor exceed a NOx amount threshold, (ii) a temperature value provided by a temperature sensor upstream of a turbine is above a first temperature threshold, and (iii) a temperature value provided by a temperature sensor downstream of the lean NOx trap is above a second temperature threshold; and
    controlling the NOx regeneration process by using the air/fuel ratio values provided by an air/fuel ratio sensor located upstream of the lean NOx trap and the NOx measurement provided by the NOx sensor such that the air/fuel ratio value remains below an air/fuel ratio threshold during the NOx regeneration process.

7. A non-transitory computer readable medium comprising a computer-code executable on a processor such that the processor is configured to:
    evaluate a NOx storage amount in a lean NOx trap as a function of a NOx amount, which derives from an engine combustion, and a NOx measurement downstream of the lean NOx trap, which is performed by a NOx sensor;
    evaluate NOx tailpipe emissions as a function of the NOx storage amount;
    initiating a NOx regeneration process when: (i) a NOx tailpipe emissions provided from the NOx sensor exceed a NOx amount threshold, (ii) a temperature value provided by a temperature sensor upstream of a turbine is above a first temperature threshold, and (iii) a temperature value provided by a temperature sensor downstream of the lean NOx trap is above a second temperature threshold; and
    control the NOx regeneration process by using the air/fuel ratio values provided by an air/fuel ratio sensor located upstream of the lean NOx trap and the NOx measurement provided by the NOx sensor such that the air/fuel ratio value remains below an air/fuel ratio threshold during the NOx regeneration process.

* * * * *